United States Patent
Franz et al.

(10) Patent No.: US 10,850,641 B2
(45) Date of Patent: Dec. 1, 2020

(54) SEAT FOR A VEHICLE

(71) Applicant: Bayerische Motoren Werke Aktiengesellschaft, Munich (DE)

(72) Inventors: Matthias Franz, Groebenzell (DE); Harald Lathwesen, Mauern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/567,022

(22) Filed: Sep. 11, 2019

(65) Prior Publication Data
US 2020/0001744 A1  Jan. 2, 2020

Related U.S. Application Data

(63) Continuation of application No. PCT/EP2018/055320, filed on Mar. 5, 2018.

(30) Foreign Application Priority Data

Mar. 13, 2017 (DE) .................. 10 2017 204 111

(51) Int. Cl.
*B60N 2/02* (2006.01)
*B60N 2/874* (2018.01)
*B60N 2/90* (2018.01)
*A47C 7/38* (2006.01)
*A47C 7/62* (2006.01)
(Continued)

(52) U.S. Cl.
CPC .............. *B60N 2/0292* (2013.01); *A47C 7/38* (2013.01); *A47C 7/62* (2013.01); *A47C 7/74* (2013.01); *B60N 2/56* (2013.01); *B60N 2/874* (2018.02); *B60N 2/976* (2018.02)

(58) Field of Classification Search
CPC ...... B60N 2/0292; B60N 2/874; B60N 2/976; B60N 2/56; A47C 7/38; A47C 7/62; A47C 7/74
USPC .......................................... 297/94
See application file for complete search history.

(56) References Cited

U.S. PATENT DOCUMENTS 242,997 A  6/1881  Simonson
2,858,880 A * 11/1958 Fox ...................... B60N 2/0292
                                                                    297/93
(Continued)

FOREIGN PATENT DOCUMENTS

CN     101797897 A   8/2010
DE     84 15 338 U1  8/1984
(Continued)

OTHER PUBLICATIONS

International Search Report (PCT/ISA/210) issued in PCT Application No. PCT/EP2018/055320 dated Jun. 5, 2018 with English translation (four (4) pages).
(Continued)

*Primary Examiner* — Mark R Wendell
(74) *Attorney, Agent, or Firm* — Crowell & Moring LLP

(57) ABSTRACT

A seat has a first seat element and a second seat element. In a first seat position of the seat, the first seat element forms a seat base of the seat and the second seat element forms at least part of a backrest of the seat. In a second seat position of the seat, the second seat element forms the seat base of the seat and the first seat element forms at least part of the backrest of the seat.

17 Claims, 1 Drawing Sheet

(51) Int. Cl.
*A47C 7/74* (2006.01)
*B60N 2/56* (2006.01)

(56) References Cited

U.S. PATENT DOCUMENTS

| | | | | |
|---|---|---|---|---|
| 3,529,863 | A * | 9/1970 | Belfry | B60N 2/305 |
| | | | | 296/66 |
| 3,743,350 | A * | 7/1973 | Allen | A47C 17/1756 |
| | | | | 297/94 |
| 3,844,608 | A | 10/1974 | Freedman | |
| 5,056,849 | A | 10/1991 | Norris, Jr. et al. | |
| 5,098,154 | A | 3/1992 | Emery | |
| 6,273,810 | B1 * | 8/2001 | Rhodes, Jr. | A47C 4/54 |
| | | | | 454/120 |
| 6,474,741 | B2 | 11/2002 | Kamida et al. | |
| 10,065,711 | B2 * | 9/2018 | Fuller, IV | B60N 2/3031 |
| 10,457,398 | B2 * | 10/2019 | Kirkley | B64D 11/0698 |
| 2004/0256894 | A1 | 12/2004 | McManus et al. | |
| 2009/0256405 | A1 | 10/2009 | Peter et al. | |
| 2017/0225751 | A1 * | 8/2017 | Fuller, IV | B60N 2/995 |
| 2020/0223326 | A1 * | 7/2020 | Tanaka | B60N 2/0248 |

FOREIGN PATENT DOCUMENTS

| | | |
|---|---|---|
| DE | 10 2008 021 264 A1 | 11/2009 |
| GB | 2513251 A | 10/2014 |

OTHER PUBLICATIONS

German-language Written Opinion (PCT/ISA/237) issued in PCT Application No. PCT/EP2018/055320 dated Jun. 5, 2018 (five (5) pages).

German-language Search Report issued in counterpart German Application No. 102017204111.0 dated Jul. 17, 2017 with partial English translation (14 pages).

* cited by examiner

SEAT FOR A VEHICLE

CROSS REFERENCE TO RELATED APPLICATIONS

This application is a continuation of PCT International Application No. PCT/EP2018/055320, filed Mar. 5, 2018, which claims priority under 35 U.S.C. § 119 from German Patent Application No. 10 2017 204 111.0, filed Mar. 13, 2017, the entire disclosures of which are herein expressly incorporated by reference.

BACKGROUND AND SUMMARY OF THE INVENTION

The present invention relates to a seat for a vehicle, in particular for a motor vehicle.

A motor vehicle seat, for example, is already known which has a pivotable backrest. For the purpose of modifying or enlarging an interior space, such a backrest can be pivoted onto a seat base, for example, in order to be able to transport long items, for example, in the motor vehicle.

In motor vehicles, it is morever known for a motor vehicle seat to be able to be removed by a user without tools for the purpose of varying an interior space.

Furthermore, it is also previously known for a seat to be rotated, for example, from a position facing in the direction of travel to another position. This has a known application, for example, in so-called mobile homes or other motor vehicles equipped for camping.

However, rotation of a seat, particularly in passenger vehicles with limited space in their interior, often entails the problem that there is too little room available for pivoting or rotating the seat, and rotation of the seat is impeded, for example, by a body pillar, a central console, or the like.

The object of the present invention is therefore to make available a seat for a motor vehicle, wherein the seat can be easily transferred by a user to another seat position within a confined space.

A seat according to the invention has a first seat element and a second seat element. In a first seat position of the seat, the first seat element forms a seat base of the seat and the second seat element forms at least part of a backrest of the seat. Moreover, in a second seat position of the seat, the second seat element forms the seat base of the seat and the first seat element forms at least part of the backrest of the seat.

According to a preferred development, the first seat element and the second seat element are coupled to each other and are together transferrable along a pivot path between the first seat position and the second seat position. It is thus easy to change between the seat positions, for example without the seat having to be rotated.

The first seat element and the second seat element are preferably pivotable via a multiple-joint bearing, in particular a four-joint bearing. A multiple-joint bearing can reliably ensure the function of a change of seat position over a long period of time.

Alternatively, the first seat element and the second seat element are pivotable via a slotted guide mechanism. More complex pivot paths can be realized with a slotted guide mechanism than with the multiple-joint bearing.

According to a particularly preferred development, the seat moreover has a third seat element which, in the first seat position, forms the backrest of the seat together with the second seat element and, in the second seat position, forms the backrest of the seat together with the first seat element.

In this way, the backrest of the seat can be made longer than the seat base of the seat in both seat positions.

The third seat element can preferably be of a flexible configuration. This can be advantageous when transferring the seat between the seat positions. Moreover, both in the first position and in the second position, the third seat element is ergonomically adaptable as a constituent part of the respective backrest.

The first seat element, the second seat element and the third seat element are advantageously coupled to each other. This simplifies a movement of the seat to the first seat position and to the second seat position. The movement of one of the seat elements thus automatically causes a corresponding movement of the other seat elements coupled thereto. The maneuvering of the seat is thus further improved.

Moreover, in the seat according to the invention, the first seat element and the second seat element can each have a headrest in their backrest position.

The headrest is preferably adjustable between a stowed position and a use position. When the associated seat element is located in the seat base position, the headrest is preferably in the stowed position. When the associated seat element is located in the backrest position, the headrest can be adjusted to the use position. In the backrest position of the respective seat element, the headrest is adjustable to one or more different use positions.

The first seat element and the second seat element are preferably configured identically to each other, in particular in terms of a geometric shape, an upholstery, a cover and/or a comfort function.

Thus, in the first seat position and also in the second seat position, the seat is identical in respect of the geometric shape, the upholstery, the cover or the comfort function.

Moreover, the first seat element and the second seat element are preferably configured differently from each other, in particular in terms of a geometric shape, an upholstery, a cover and/or a comfort function.

Thus, for example, in the first seat position the seat can be configured differently from the second seat position. For example, in the first seat position, the seat can be suitable for a driving position and, in the second seat position, the seat can be suitable for a resting or relaxation position.

According to a further development of the present invention, the first seat element and the second seat element can be configured to be adaptable in particular in terms of a geometric shape and/or an upholstery. Thus, each seat element from the first seat element and the second seat element is adaptable for a seat base function and a backrest function. In addition, the third seat element can also be adaptable in terms of a geometric shape and/or an upholstery, such that the third seat element is also adaptable to the seat base function or backrest function.

It is thus possible to adapt the respective seat element to its function, i.e. the seat base function or the backrest function, in the respective seat position.

For this purpose, the first seat element and the second seat element can have corresponding fluid elements, by which the adaptation of the respective seat element to the seat base function and the backrest function is controllable. Fluid elements are, for example, hydraulic elements or pneumatic elements with which a seat geometry can be modified. For this purpose, in the manner of an active seat, the seat can have bladders at suitable positions, which bladders, according to requirements, can be filled with a fluid and emptied again.

According to a preferred development of the seat, the first seat element and/or the second seat element have at least one adjustable comfort function, in particular a body-stabilizing function, a massage function or a seat air-conditioning function.

According to a preferred development, the seat can be used in a vehicle or a motor vehicle, in particular a watercraft, an aircraft or a land vehicle, for example a rail vehicle or a road vehicle, such as a passenger vehicle or a goods vehicle, or a motor home. The vehicle can be an autonomously driven vehicle.

The vehicle can preferably be an autonomously driven vehicle in which the seat is transferrable from a driving-oriented position to a non-driving-oriented position.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
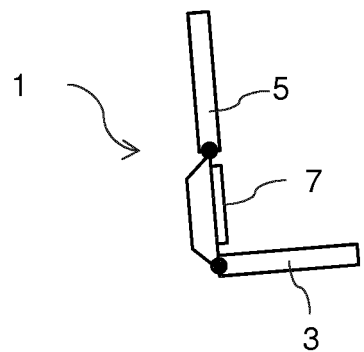
FIG. 1 is a schematic side view of a vehicle seat in a first seat position according to an illustrative embodiment of the present invention.

FIG. 1 shows a schematic side view of a vehicle seat 1 in a first seat position according to the illustrative embodiment of the present invention. The vehicle seat 1 has a first seat element 3 and a second seat element 5. In the first seat position, shown in FIG. 1, the first seat element 3 forms a seat base. In the first seat position, shown in FIG. 1, the second seat element 5 forms a backrest of the vehicle seat 1. Moreover, the vehicle seat 1 has a third seat element 7, which forms an intermediate element. In the first seat position, the intermediate element 7, together with the second seat element 5, forms the backrest of the vehicle seat 1. The first seat element 3 and the second seat element 5 are mechanically coupled to each other via the intermediate element 7. The intermediate element 7 is moreover mounted on a vehicle base via suitable multiple-joint kinematics. Both the first seat element 3 and the second seat element 5 are pivotably connected in an articulated manner to the intermediate element 7. The first seat element 3, the second seat element 5 and the intermediate element 7 have a suitable upholstery with a suitable cover material.

Figure 3:
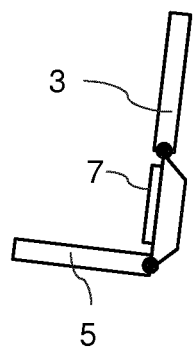
FIG. 3 is a schematic side view of the vehicle seat in a second seat position according to the illustrative embodiment of the present invention.

FIG. 3 shows a schematic side view of the vehicle seat 1 in a second seat position according to the illustrative embodiment of the present invention. Here, the first seat element 3 forms, together with the intermediate element 7, the backrest of the vehicle seat 1. By contrast, in the second seat position, the second seat element 5 forms the seat base of the vehicle seat 1. The orientation of the vehicle seat 1 in the second seat position is thus counter to the orientation of the vehicle seat 1 in the first seat position.

Thus, both in the first seat position and in a second seat position, the intermediate element 7 can compensate for a difference in length between a backrest and a seat base, since the first seat element 3 and the second seat element 5 are of equal length. On the seat base side or backrest side, the intermediate element 7 can be configured with seat strips arranged alongside one another in a transverse direction.

Figure 2:
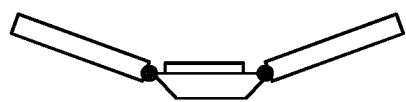
FIG. 2 is a schematic side view of the vehicle seat in an intermediate position according to the illustrative embodiment of the present invention.

The vehicle seat 1 can be transferred from the first seat position to the second seat position via the multiple-joint kinematics of the intermediate element 7. FIG. 2 shows an intermediate position of the vehicle seat 1 between the first seat position and the second seat position. In this intermediate position, the vehicle seat 1 can be used as a recliner seat.

A headrest can be mounted on each of the first seat element 3 and second seat element 5. The headrest is transferrable from a stowed position to a use position. In particular, the headrest in the backrest position of the respective seat element 3, 5 is transferrable to the use position. In the seat base position of the respective seat element 3, 5, the headrest is in the stowed position, in which the headrest does not impede the seat base.

The vehicle seat 1 is suitable particularly for a motor vehicle equipped for camping or for a so-called autonomously driven motor vehicle. Even when space is limited, for example when a rotation of the vehicle seat 1 about its vertical axis is not possible, the vehicle seat 1 can be changed between two seat positions. For example, the vehicle seat 1 can be located in a direction of travel in the first seat position and can thus be configured as a driver's seat. By contrast, in the second seat position, the vehicle seat 1 is oriented in an opposite direction. Overall, a simple change of direction of the vehicle seat 1 according to the illustrative embodiment is possible in a very confined space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat, comprising:
    a first seat element;
    a second seat element;
    a third seat element arranged intermediately between the first and second seat elements, wherein
        the first and second seat elements are separate elements mechanically coupled to each other via the third seat element,
        in a first seat position of the seat, the first seat element forms a seat base of the seat and the second seat element forms at least part of a backrest of the seat,
        in a second seat position of the seat, the second seat element forms the seat base of the seat and the first seat element forms at least part of the backrest of the seat, and
        in the first seat position, the third seat element forms only the backrest of the seat together with the second seat element and, in the second seat position, forms only the backrest of the seat together with the first seat element, wherein the third seat element compensates for a difference in length between the backrest and the seat base when the first and second seat elements are of substantially equal length.

2. The seat according to claim 1, wherein the seat is a vehicle seat.

3. The seat according to claim 1, wherein
the first seat element and the second seat element are coupled to each other and are together transferrable along a pivot path between the first seat position and the second seat position.

4. The seat according to claim 1, wherein
the first seat element and/or the second seat element have a headrest, which is adjustable from a stowed position to a use position.

5. The seat according to claim 1, wherein
the first seat element and the second seat element are configured identically to each other in terms of a geometric shape, an upholstery, a cover and/or a comfort function.

6. The seat according to claim 1, wherein
the first seat element and the second seat element are configured differently from each other in terms of a geometric shape, an upholstery, a cover and/or a comfort function.

7. The seat according to claim 1, wherein
the first seat element and the second seat element are configured to be adaptable in terms of a geometric shape and/or an upholstery, such that each seat element is adaptable for a seat base function and a backrest function.

8. The seat according to claim 7, wherein
the first seat element and the second seat element have fluid elements, by which the adaptation to the seat base function and the backrest function is controllable.

9. The seat according to claim 1, wherein
the first seat element, the second seat element and the third seat element are configured to be adaptable in terms of a geometric shape and/or an upholstery such that each of said seat element is adaptable for a seat base function and a backrest function.

10. The seat according to claim 1, wherein
the first seat element and/or the second seat element have at least one adjustable comfort function.

11. The seat according to claim 10, wherein
the at least one adjustable comfort function is a body-stabilizing function, a massage function or a seat air-conditioning function.

12. The use of a seat according to claim 1 in a vehicle, wherein the vehicle is a motor vehicle.

13. A vehicle, comprising:
a seat comprising
a first seat element;
a second seat element;
a third seat element arranged intermediately between the first and second seat elements, wherein
in a first seat position of the seat, the first seat element forms a seat base of the seat and the second seat element forms at least part of a backrest of the seat, and
in a second seat position of the seat, the second seat element forms the seat base of the seat and the first seat element forms at least part of the backrest of the seat, and
in the first seat position, the third seat element forms only the backrest of the seat together with the second seat element and, in the second seat position, forms only the backrest of the seat together with the first seat element, wherein the third seat element compensates for a difference in length between the backrest and the seat base when the first and second seat elements are of substantially equal length.

14. The vehicle according to claim 13, wherein
the vehicle is a watercraft, an aircraft or a land vehicle.

15. The vehicle according to claim 13, wherein
the vehicle is a rail vehicle or a road vehicle.

16. The vehicle according to claim 13, wherein
the vehicle is an autonomously driven vehicle.

17. The vehicle according to claim 13, wherein
the vehicle is a motor home.

* * * * *